May 28, 1963 L. A. MEACHAM 3,091,666

PARTY IDENTIFICATION FOR TELEPHONE SUBSTATIONS

Filed May 19, 1960

INVENTOR
L. A. MEACHAM
BY Joseph C. Redmond, Jr.
ATTORNEY

United States Patent Office 3,091,666

Patented May 28, 1963

3,091,666

PARTY IDENTIFICATION FOR TELEPHONE SUBSTATIONS

Larned A. Meacham, New Providence, N.J., assignor to Bell Telephone Laboratories, Incorporated, New York, N.Y., a corporation of New York Filed May 19, 1960, Ser. No. 30,174
8 Claims. (Cl. 179—17)

Figures 1, 2:
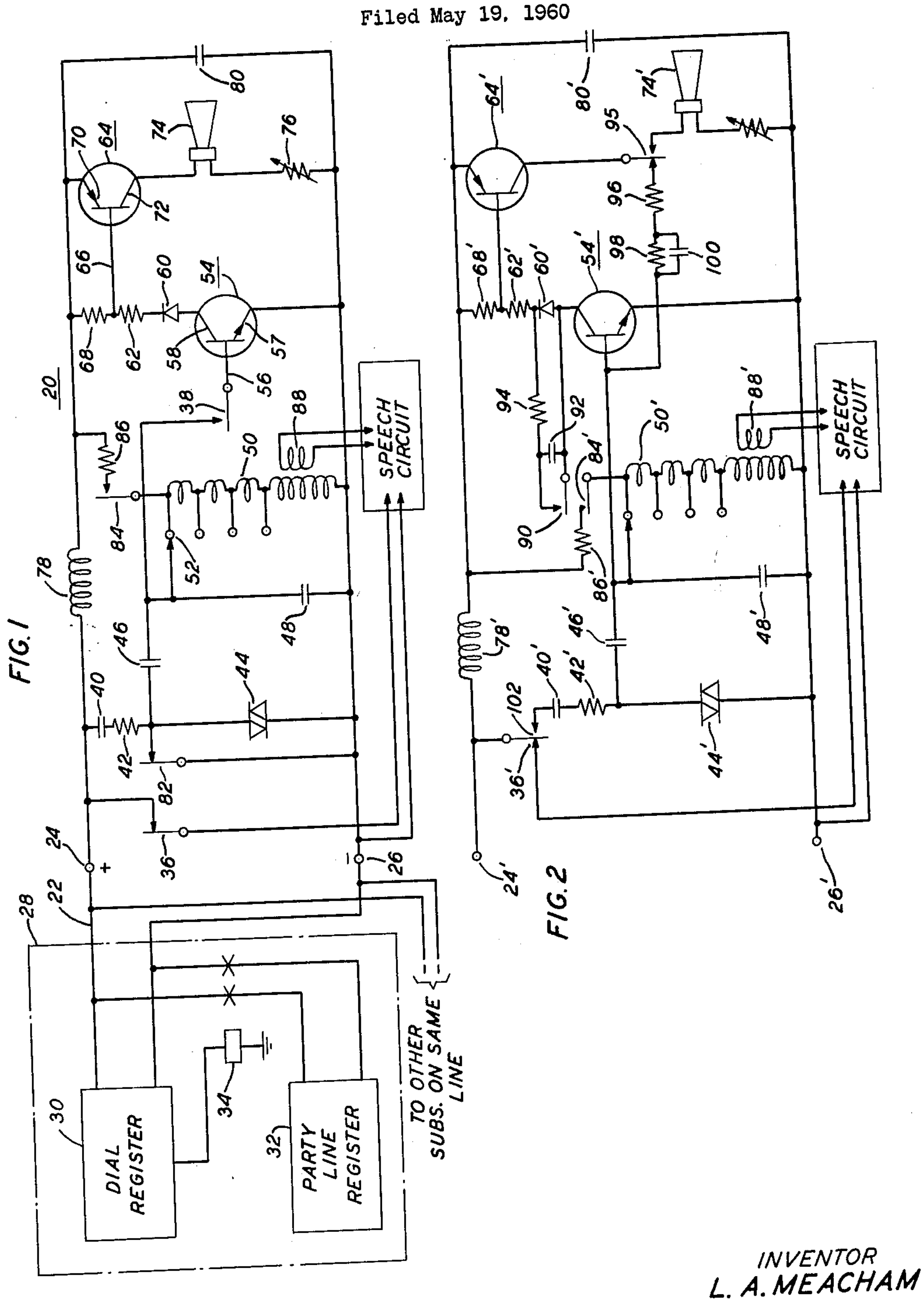

This invention relates to telephone systems employing speech level audio frequency signaling as contrasted with conventional signaling systems which interrupt large direct currents for dialing and transmit 20 cycle current at large voltages for ringing. More particularly, the present invention relates to the identification of calling stations on multiparty lines included in speech level audio frequency signaling systems.

Telephone systems of the type disclosed in my United States Patent 2,908,762, issued October 13, 1959, employ speech level audio frequency signaling at the central office to signal a called station from a calling station. Each substation in a system of this type is provided with a frequency selective tone ringing circuit which is arranged to respond to one and only one of a plurality of alternative ringing frequencies or tones sent from the central office.

A variety of party line identification circuits have been disclosed for telephone systems of the type previously described. One proposal assigns an additional frequency to a substation for such identification, the subscriber operating a key or button at the completion of a series of digit signals to transmit the identifying frequency of the calling station to a central office. Another proposal, described in my United States Patent 2,908,762 cited above, transmits a discrete party identification signal when the handset of a substation is removed to operate the switchhook contacts. Both of these proposals require that a single identifying signal be sent before or after the series of digit signals dialed by a subscriber with the resulting possibility that such identifying signal delays the completion of a talking circuit or may be lost in interference or noise before identification of the station can be completed. Party line identification circuits which transmit a plurality of identifying signals in the interdigital intervals overcome substantially all of the restrictions presented by identification circuits of the type previously mentioned. Circuits of this type are disclosed in United States patent application Serial No. 472,003, filed November 30, 1954, now Patent No. 2,966,533, issued December 27, 1960, and assigned to the same assignee as that of the present invention. Such circuits relate to conventional signaling systems in contrast to low level audio frequency signaling systems and as a result employ additional components to those included in the substation in order to generate a discrete signal which identifies the calling station. It is desirable, therefore, that identification circuits for telephone systems employing speech level frequency signaling be provided which are based on the principles of transmitting party line identifying signals during the interdigital intervals of dialing. Such circuits should be compatible with circuits already existing in the substation and require a minimum of accessories to form such compatible circuits.

A general object of the present invention is an improved party line telephone substation identifier circuit for telephone systems employing low level audio frequency signaling.

One object is a compatible circuit for performing the functions of selective ringing and generating party identification signals for transmission during the interdigital intervals of dialing.

Another object is an identification circuit for subscriber stations which minimizes the appearance of false signals at the party line registers located at the central office.

One feature disables the tone ringer during dialing and stores energy in the inductive element of such tone ringer for transmission as a station identifier signal during the interdigital intervals of dialing.

Another feature is the addition of one or two sets of contacts to the tone ringer circuit to permit the call transmitter to render the tone ringer circuit compatible for either frequency selective ringing or party line identification.

Still another feature is the generation of an identification signal of sufficient magnitude to saturate the speech amplifier of a substation and prevent amplifier response to speech voltages which might otherwise provide a false identification signal.

Another feature is connecting the party line register to the telephone line during the interval that the speech amplifier is saturated.

In one illustrative embodiment one or more substations are connected to a central office over a telephone line included in a system employing speech level frequency signaling. The substation has a speech circuit, a speech amplifier, and a frequency selective tone ringer circuit tuned to a particular frequency assigned to that substation and no other substation on the line. Reproducer means connected to the tone ringer circuit provide an audible signal when the particular or assigned frequency is transmitted to the substation from the central office. Also included in the substation are a call transmitter and a party line identification signal generator, the latter element providing a direct current path through the tone ringer each time the call transmitter is operated. Switch means operated by the call transmitter interrupt the flow of current through the tone ringer circuit at the end of each operation thereof, the ringer circuit producing a discrete signal which is suitably coupled into the speech circuit and transmitted to the central station to identify the calling station. The identification signal is of a magnitude to saturate the speech amplifier for a preselected interval to prevent speech voltages being transmitted to the party line registers at the central office. During the interval that the speech amplifier is saturated, the party line register is connected to the line so that only the identification signal is received at the register.

Further objects and features of the present invention will be more fully apprehended from the following detailed specification when taken in conjunction with the appended drawing in which:

FIG. 1 is one electrical schematic of those circuits of a conventional substation modified in accordance with the principles of the present invention for party line identification, the substation being connected to a multiparty line served by a central office; and FIG. 2 is an electrical schematic of another form of the present invention disclosed in FIG. 1.

Referring to FIG. 1, a single substation 20 is shown connected to telephone line 22 at terminals 24 and 26. Also connected to this same line is a plurality of other substations (not shown) which are represented diagrammatically by the bracket in the lower left hand portion of FIG. 1. The telephone line 22 terminates in a central office 28 for speech level frequency signaling systems which is represented in part at least by a dial register 30 and a party line identification register 32, the former element being shown, for example, in United States Patent 2,332,912, issued October 26, 1943, and the latter element being shown in my Patent 2,908,762 cited above. The party line register is connected to the telephone line 22 by a slow release relay 34 of conventional design when energized from the dial register, as will be explained in more detail hereinafter.

Returning to the substation 20, only the tone ringer and speech circuits therefor are shown. The other details of the substation, for example, relating to the call transmitter, typically a dial or pushbutton mechanism and receiver which are well known in the art, have been indicated generally for reasons of convenience in explanation of the present invention. The speech circuit, which will be described in more detail hereinafter, is connected and disconnected to the line 22 by switchhook contacts 36. Connected across the line 22 is a series circuit comprising condenser 40, resistor 42 and a varistor 44 which advantageously may comprise a pair of oppositely poled diodes of the silicon type. The purpose of condenser 40 is to prevent any direct current from flowing through this series circuit. The purpose of resistor 42 and varistor 44 is to provide a means whereby a relatively constant amplitude of voltage appears across the varistor despite a wide variation in the value of the ringing voltage applied to the terminals 24 and 26. The two diodes of the varistor act as voltage limiters or amplitude clippers and effectively limit the amplitude of the voltage applied to the tuning circuit of the tone ringer which includes capacitor 46 in series with a parallel resonant circuit comprising capacitor 48 and inductance 50. The parallel resonant circuit is adjusted to a particular frequency by means of taps 52 included in the inductance. The parallel resonant circuit is also connected to a first transistor 54 through the base 56 thereof by means of switchhook contact 38. The output of the transistor 54 is taken from collector 58 thereof and applied through diode 60 and resistor 62 to a second transistor 64 by way of base 66 thereof. The base of transistor 64 is biased to a suitable potential by means of resistor 68 connected to the line 22. Completing the connections of the transistor 64 is an emitter 70 also connected to the telephone line 22 and collector 72 which supplies the output of the transistor to a horn type transducer 74 in series with a variable resistor 76 connected to the same side of the line 22 as the emitter 57 of the transistor 54. The horn 74 emits an audible tone to notify the subscriber of a call when the particular frequency of the series-parallel resonant circuit is transmitted to the substation from the central office. The volume of the signal emitted by the horn is adjusted to the desired level by the resistor 76. An inductance 78 acts as a choke which in conjunction with condenser 80 prevents the output of the transistor amplifier from appearing on the line to any objectionable extent during the ringing interval.

The circuit described to this point represents the details of the frequency selective tone ringer portion of the substation which responds to one of a plurality of frequencies transmitted from the central office to signal the subscriber when a calling party desires to reach that station. The details of the operation of such a ringer are fully disclosed in several patents as, for example, my Patent 2,908,762 cited above as well as those listed in the specification of that patent. For reasons of brevity, it is believed that no further description is necessary to describe this portion of the present invention.

To convert the frequency selective tone ringer circuit into a compatible party identification circuit, it is only necessary to add a set of switchhook contacts 82 connected across the varistor 44 in addition to the switchhook contact 36 in the path to the speech circuit and the switchhook contact 38 connected between the series-parallel resonant circuit and the transistor 54. Also a call transmitter-operated contact 84 is adapted to connect the inductance 50 of the parallel resonant circuit to the telephone line through a resistor 86. The call transmitter-operated contacts may be operated from any convenional rotary dial or pushbutton mechanism and such detail is believed to be readily apparent to a worker skilled in the art. Finally, a winding 88 couples the output of the inductance 50 to the speech circuit of the substation. The speech circuit is identical to that disclosed in Patent 2,801,288 to L. A. Meacham, issued July 30, 1957, and is incorporated as a part of this specification to the same extent as if fully disclosed herein. The details of this speech circuit together with the intricacies of operation as disclosed in the Meacham patent are not necessary to an understanding of the present invention in that insofar as they are concerned it is only necessary to understand that the speech circuit impresses the signals from the inductance 50 onto the line 22.

Since the speech amplifier circuit and the input network of the tone ringer are connected in parallel across the line 22 and coupled together through the winding 88, a feedback path potentially exists about the speech amplifier circuit. To avoid adverse effects of such feedback, the feedback path is short circuited by switchhook contacts 82 around the varistor 44.

To operate the identification circuit, the handset (not shown) is removed from the switchhook, setting the off-hook contact arrangement shown in FIG. 1, wherein the two stage transistor amplifier is disconnected from the series-parallel resonant circuit by means of contact 38. When the call transmitter (not shown) is operated, contacts 84 close to permit line current I to flow through the resistor 86 and the inductance 50 of the series-parallel resonant circuit storing magnetic energy in the inductance. The principal limitation on the energy $LI^2/2$ thus stored is the drop across the resistor 86. Hence, relatively large voltage proportional to the line voltage can be developed in the resonant circuit when the current I is interrupted, as will become more apparent hereinafter. On release of the call transmitter, contacts 84 open and the stored energy in the series-parallel resonant circuit is dissipated in a damped oscillatory signal which is coupled into the speech amplifier by the winding 88. The value of the current I is so chosen that there is sufficient energy available to drive the speech amplifier to saturation or peak limiting during the early portion of the decay of the damped oscillatory signal. This strong signal overrides the speech amplifier and blocks the response thereof to any false identification signals, typically speech voltages, that may be present as a result of microphone pick-up. The capture of the speech amplifier by the strong signal to the exclusion of the interfering signal is more fully described in my patent application Serial No. 743,434, filed June 30, 1958. Thus, the initial portion of the signal transmitted by the amplifier over the line 22 is dominated by the identification signal.

The reception of false identification signals at the central office is further prevented by means adapted to connect the party line register to the line 22 at the same time that dial pulses are received, and to hold the register connected to the line while the dominant identification signal is received at the register. This is accomplished by providing an output voltage from the dial register to the party line register when dial signals are received, the voltage energizing a fast operate but slow release relay 34 to connect the party line register to the telephone line. The relay 34 is connected in a manner which is believed to be readily apparent to any worker skilled in the art. After termination of the dial signals, the slow release relay holds up for a preselected interval to permit the arrival of the dominant identification signal while the speech amplifier is blocked. At the end of this interval and before the next dial signals are received at the register 30, the slow release relay 34 opens to disconnect the party line register from the telephone line. Hence, the party line register becomes connected to the line while only the dominant identification signal is being received at the register, thereby preventing false signals from appearing at the register until after registration has been performed and the register has thereby been made temporarily insensitive.

Each time the call transmitter is operated the identification signal is repeated, such redundance permitting the checking of the signal under control of the switching system for still more secure designation of the calling substation. Moreover, the signal is sent from the calling station only after a dialing operation and cannot be falsely triggered. Hence, the present invention provides a compatible circuit for speech level signaling systems which transmits identification signals during the interdigital intervals of dialing by simple modifications to the call mechanism and the tone ringer circuit and is also responsive to selective speech level signaling. The strong signals developed in the series-parallel resonant circuit and the connection of the party line registers to the telephone line at the proper instant in time insure the arrival of identification signals only at the party line registers.

Another or second compatible frequency selective and party line identification circuit is shown in FIG. 2 wherein corresponding elements to those shown in FIG. 1 are indicated by corresponding numbers which are primed. The circuit shown in FIG. 2 is adapted to generate and transmit a sustained identification signal as contrasted to a damped oscillatory signal developed by the embodiment shown in FIG. 1. The second circuit is connected to the terminals 24 and 26 in place of the circuit shown in FIG. 1. In FIG. 2, as in FIG. 1, the inductance 50′ is connected to the telephone line 22 through call transmitter contacts 84′ in series with resistor 86′. Contrary to FIG. 1, however, the two stage transistor amplifier is not disconnected from the series-parallel resonant circuit by means of switchhook contacts during the off-hook condition of the handset. Instead, the transistor amplifier is disabled by the diode 60′ in conjunction with the reduced line voltage obtaining while the set is off-hook until the call transmitter is operated whereupon the diode 60′ is bypassed by the closure of a second set of transmitter-operated contacts 90 installed in the manner adopted for the contacts 84′. The contacts 90 are connected across a capacitor 92 of a timing circuit including resistor 94. When the call transmitter-operated contacts 90 are closed along with the contacts 84′, energy is stored as before in the inductance 50′ and the capacitor 92 is discharged to enable the transistor amplifier. The output of the second stage of this amplifier is returned to the base of the first stage transistor 54′ through a feedback path including resistors 96 and 98, the latter being connected in parallel with a capacitor 100. Switchhook contacts 95 transfer the two stage amplifier circuit from the horn type transducer to the feedback circuit.

When the call transmitter is released, the series-parallel resonant circuit is shocked into oscillation and the resulting wave is supplied as input to the transistor amplifier which remains enabled because of the current path existing about the diode 60′ while the capacitor 92 is charging. The transistor amplifier output is returned to the input through the feedback network and thus sustains the oscillation, which is coupled into the speech circuit through the winding 88′ for transmission to the party line register 32 at the central office. The design of the amplifier circuit is such that the signal coupled into the speech circuit is relatively strong as compared to the microphone pickup signals so that the sustained signal captures the amplifier and alone is transmitted to the central office as previously described in connection with the embodiment of FIG. 1. As oscillations continue, the pulses of current drawn by the transistor 54′ gradually charge the capacitor 92 until the collector voltage on the transistor 54′ approaches zero. When the collector voltage reaches a critical minimum value, oscillation can no longer be sustained and the signal ceases. The duration of the sustained signal is therefore controlled by the magnitude of the capacitor 92 and the resistors 94 and 62′ as well as by the off-hook line voltage which charges the capacitor 92.

To prevent a feedback path around the speech circuit via the capacitor 40′, resistor 42′, the series-parallel resonant circuit and winding 88′ which might modify the transmission characteristics of the substation or cause unwanted oscillation, a switchhook operated contact 102 is provided to break the path between the line 22 and the capacitor 40′. The choke 78′ also contributes to avoidance of unwanted oscillations in the previously-described feedback circuit.

It will be seen that the circuit of FIG. 2 transmits a sustained oscillation for a limited period governed in part by the charging of the capacitor 92 while in contrast the circuit of FIG. 1 transmits a damped oscillation based on the characteristics of the series-parallel resonant circuit. Although the former circuit has more components than the latter circuit, there may be other conditions which would require the use of a sustained signal in contrast to a damped signal. The sustained signal is also of a magnitude which will overload the speech amplifier and block out any microphone signals while the party line register is connected to the telephone line in the manner described for FIG. 1.

It is to be understood that the above-described circuits are but illustrative of the principles of the present invention. Numerous other circuits may be devised by those skilled in the art without departing from the spirit and scope of the invention.

What is claimed is:

1. In a telephone system a central office including a party line register, a line extending from said central office, a plurality of subscriber stations connected to said line, each subscriber station including a speech circuit incorporating a speech amplifier, a call transmitter mechanism, a frequency selective ringer circuit responsive to a ringing frequency individual thereto, reproducer means connected to the ringer circuit to produce an audible signal in the presence of the individual ringing frequency transmitted thereto from the central office, means responsive to the call transmitter mechanism for directing the line current into said frequency selective circuit during operation of the mechanism and interrupting the flow of line current upon release of the mechanism thereby producing a signal in the frequency selective circuit, said signal corresponding to the fundamental frequency of the circuit, and means for coupling said signal to the speech circuit for transmission to the central office as an identification of the subscriber station of which the call transmitter mechanism was released.

2. In a telephone system a central office including a party line register, a line extending from said central office, a plurality of subscriber stations connected to said line, each subscriber station including a speech circuit incorporating a speech amplifier, a call transmitter mechanism, a frequency selective ringer circuit responsive to a ringing frequency individual thereto, reproducer means connected to the ringer circuit to produce an audible signal in the presence of the individual ringing frequency transmitted thereto from the central office, means responsive to the call transmitter mechanism for directing line current into said frequency selective circuit during operation of the mechanism and interrupting the flow of line current upon release of the mechanism thereby producing a signal in the frequency selective circuit, said signal being in the fundamental frequency of the circuit, means for coupling said signal to the speech circuit for transmission to the central office as an identification of the subscriber station of which the call transmitter mechanism was released, said signal having a magnitude sufficient to saturate the speech amplifier so that said identifying signal is the dominant frequency passed by said speech amplifier, and means for preventing feedback of the dominant frequency into the speech amplifier.

3. In a telephone system of the type described in claim 2, means for connecting said party line register to said line while said dominant frequency is being received at the central office.

4. In a telephone system a central office including a party line register, a line extending from said central office, a plurality of subscriber stations connected to said line, each subscriber station including a speech circuit incorporating a speech amplifier, a call transmitter mechanism, a frequency selective ringing circuit having an amplifier and tuned circuits therein, said frequency selective circuit being responsive to a ringing frequency individual thereto, reproducer means connected to the amplifier for producing an audible signal in the presence of the individual ringing frequency transmitted to the subscriber station from the central office, means for disabling said amplifier circuit during the off-hook condition of the subscriber station, means responsive to the call transmitter mechanism for directing line current into said frequency selective circuit during operation of the mechanism and interrupting the flow of line current upon release of the mechanism to produce a damped oscillatory signal in the frequency selective circuit, said damped oscillatory signal being in the fundamental frequency of the frequency selective circuit, and means for coupling said damped oscillatory signal to the speech circuit for transmission to the central office as an identification of the subscriber station of which the call transmitter mechanism was released.

5. In a telephone system a central office including a party line register, a line extending from said central office, a plurality of subscriber stations connected to said line, each subscriber station including a speech circuit incorporating a speech amplifier, a call transmitter mechanism, a frequency selective ringing circuit having an amplifier and tuned circuits therein, said frequency selective circuit being responsive to a ringing frequency individual thereto, a reproducer means connected to the amplifier for producing an audible signal in the presence of the individual ringing frequency transmitted to the subscriber station, means responsive to the call transmitter mechanism for directing line current into said frequency selective circuit during operation of the mechanism and interrupting the flow of line current upon release of the mechanism to produce a damped oscillatory signal in the frequency selective circuit, said damped oscillatory signal being in the fundamental frequency of the frequency selective circuit, means for coupling said damped oscillatory signal to the speech circuit for transmission to the central office as an identifying signal of the subscriber station of which the call transmitter mechanism was released, said identifying signal being of a magnitude to saturate the speech amplifier so that said identifying signal is transmitted as the dominant frequency of the amplifier, and means for short circuiting the frequency selective circuit to prevent feedback of the dominant signal into the speech amplifier.

6. In a telephone system a central office including a party line register, a line extending from said central office, a plurality of subscriber stations connected to said line, each subscriber station including a speech circuit incorporating a speech amplifier, a call transmitter mechanism, a frequency selective ringing circuit having an amplifier and tuned circuits therein, said frequency selective circuit being responsive to a ringing frequency indivdual thereto, reproducer means connected to the amplifier for producing an audible signal in the presence of the individual ringing frequency transmitted to the subscriber station from the central office, means for disabling said amplifier circuit during the off-hook condition of the subscriber station, contact means responsive to the call transmitter mechanism for directing line current into the tuned circuit of the frequency selective circuit and interrupting the flow of line current upon release of the mechanism thereby producing a damped oscillatory signal in the tuned circuit, said damped oscillatory signal being in the fundamental frequency of the frequency selective circuit, means for coupling said damped oscillatory signal to the speech circuit for transmission to the central office as an identifying signal of the subscriber station of which the call transmitter mechanism was released, and means for connecting said party line register to the line after operation of the call transmitter mechanism and holding said register connected to the line for a preselected interval after release of the mechanism.

7. In a telephone system a central office including a party line register and a dial register, a line extending from said central office, a plurality of subscriber stations connected to said line, each subscriber station including a speech circuit which incorporates a speeh amplifier, a call transmitter mechanism, a frequency selective ringer circuit having an amplifier section and a tuned section, said ringer circuit responsive to a ringing frequency individual thereto, reproducer means connected to the ringer circuit to produce an audible signal in the presence of the individual ringing frequency transmitted to the subscriber station from the central office, means responsive to the call transmitter mechanism for directing line current into said tuned section during operation of the mechanism and interrupting the flow of line current upon release of the mechanism, means for enabling the amplifier circuit as a feedback oscillator to produce a sustained oscillatory signal in the fundamental frequency of the frequency selective circuit, and means for coupling said sustained oscillatory signal to the speech circuit for transmission to the central office as an identification of the subscriber station of which the call transmitter mechanism was released.

8. In a telephone system of the type described in claim 7 wherein the means for enabling the amplifier circuit includes a timing circuit for controlling the interval the amplifier is enabled after release of the call transmitter mechanism.

References Cited in the file of this patent

UNITED STATES PATENTS

| | | |
|---|---|---|
| 2,889,410 | Hatton | June 2, 1959 |
| 2,908,762 | Meacham | Oct. 13, 1959 |
| 2,909,609 | Svala | Oct. 20, 1959 |
| 2,963,552 | Rypinski | Dec. 6, 1960 |
| 2,966,553 | Wadsworth | Dec. 27, 1960 |